United States Patent Office 3,442,453
Patented May 6, 1969

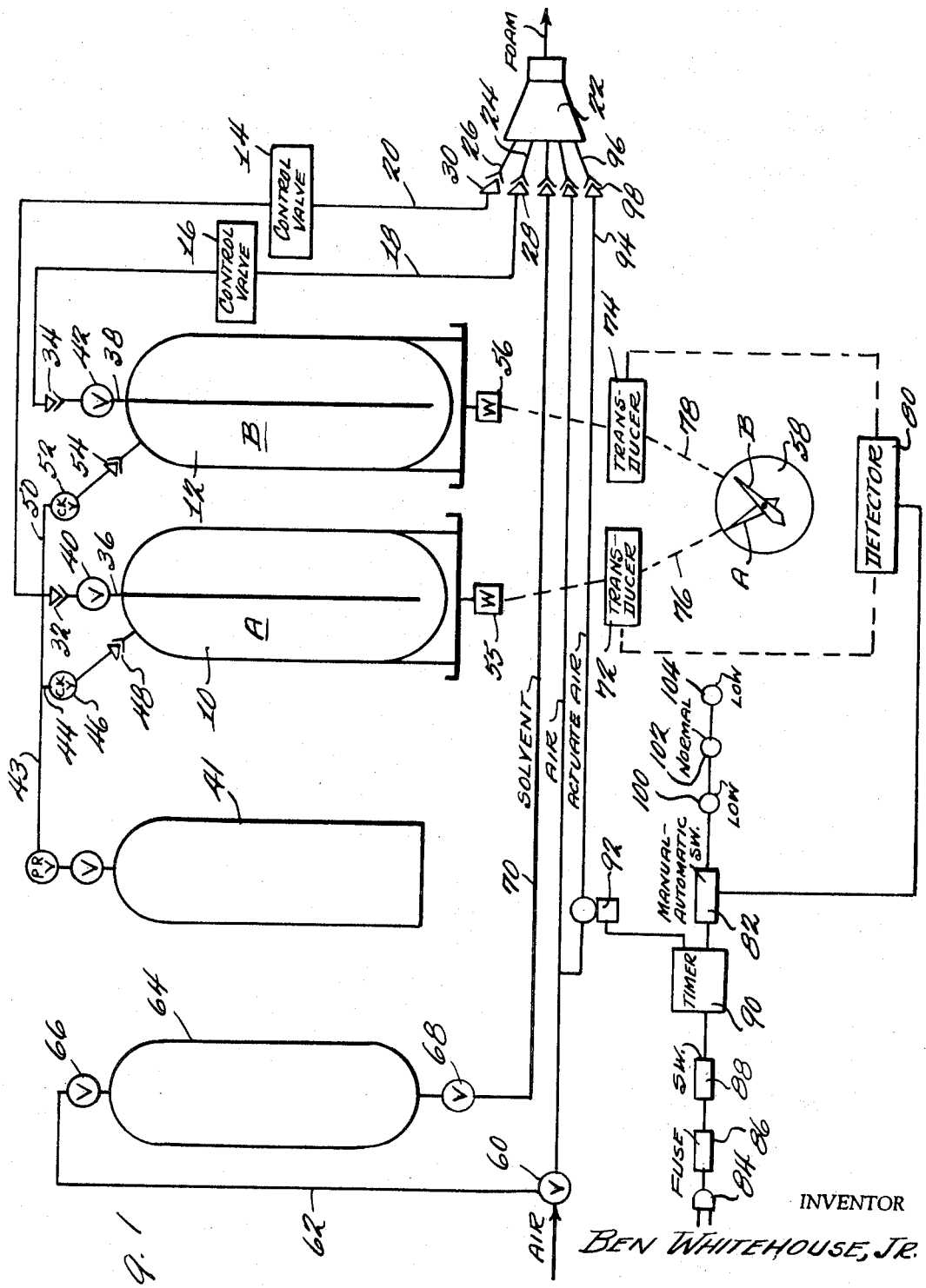

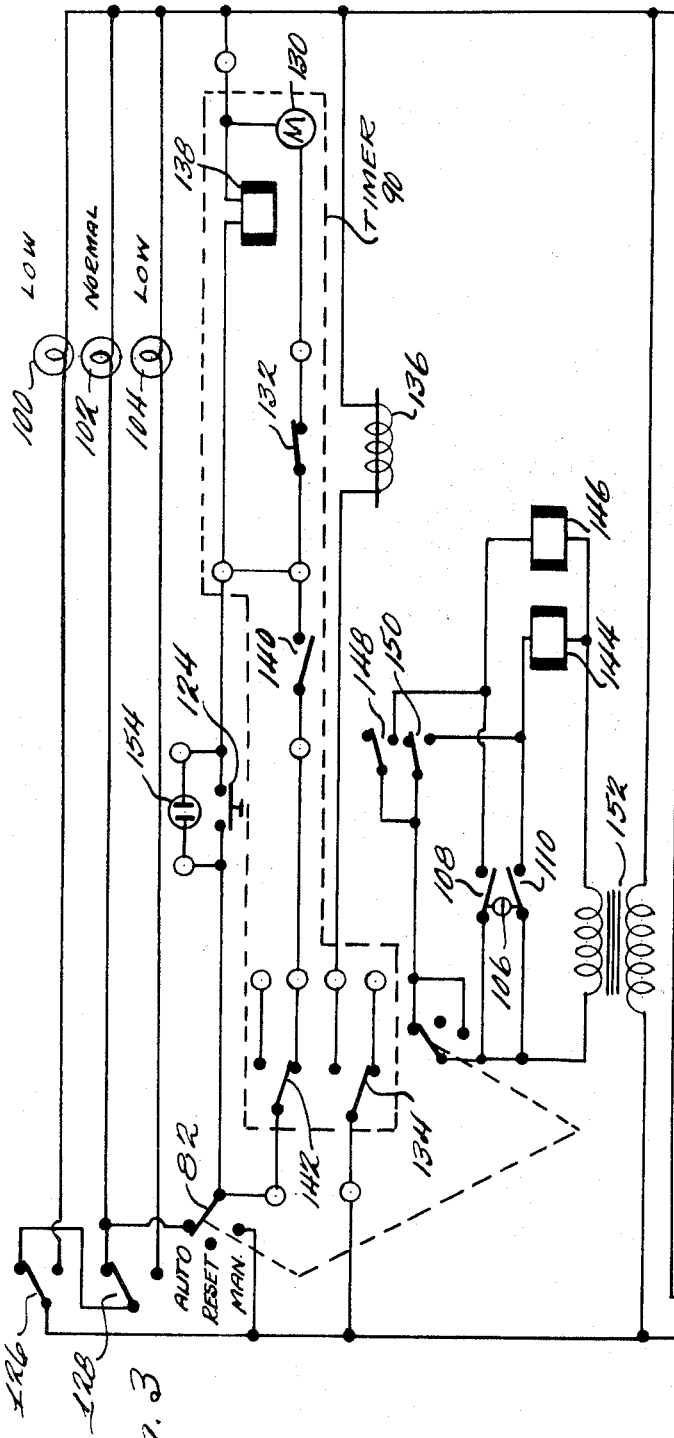
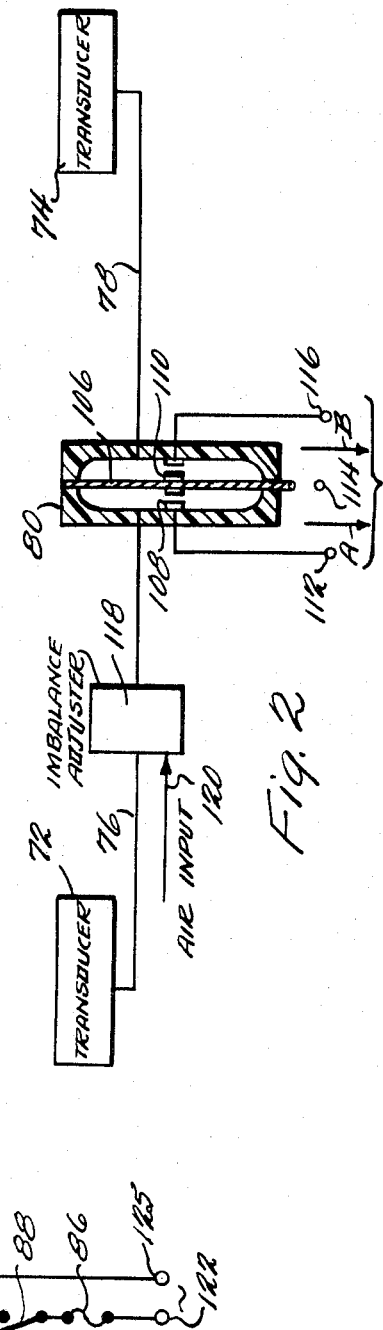

3,442,453
DISPENSING UNIT
Ben Whitehouse, Jr., 4240 Whitfield Ave.,
Fort Worth, Tex. 76109
Filed Apr. 30, 1965, Ser. No. 452,171
Int. Cl. B67d 5/08; A62c 13/60; B05b 7/06
U.S. Cl. 239—71     9 Claims

ABSTRACT OF THE DISCLOSURE

A method and apparatus for accurately measuring the ingredients of a foamed or expanded material and supplying those ingredients to an applicator. A pressurized supply reservoir is provided for each of the ingredients and these reservoirs are connected to an applicator. Means are provided for metering the flow of ingredients to the applicator and for continuously monitoring the inventory of the reservoirs. An electrical system is also arranged with respect to the monitoring means for selectively supplying air to the applicator so that the manufacture of foam is controlled in response to the sensed inventory of the reservoirs.

---

This invention relates to an improved method of and means for accurately measuring various ingredients of a foamed or expanded material and supplying said ingredients to an applicator. More particularly the apparatus and method of the instant invention are especially suitable in a "one-shot" system for making and dispensing a foamable material wherein all of the ingredients are mixed at one time under very carefully controlled conditions to form a finished expanded material.

Heretofore, in the preparation and dispensing of ingredients suitable for producing a foamed or expanded material, the ingredients were maintained in separate vessels under atmospheric pressure. Pump means were provided for conducting the ingredients to an applicator such as a spray gun provided with a plurality of chambers from which the ingredients were discharged through a common nozzle or orifice.

Several disadvantages associated with such a system involved the pump means employed to conduct the ingredients to the applicator. Thus, pump surge and pump slippage often resulted in an unbalanced mixture of the separate ingredients, producing an inferior product. Moreover extreme care had to be exercised to insure that the pump means operated synchronously so that the separate ingredients were delivered simultaneously in the proper amounts to the applicator.

Other disadvantages associated with prior art methods of foaming or expanding resins included the necessity of providing elaborate means for maintaining a constant viscosity of the materials which, due to their exposure to atmospheric or ambient conditions, fluctuated with changes in such conditions. Additionally, means for continuously monitoring the inventory of the ingredients being employed to produce the expanded material were not provided. Thus, in prior art systems, malfunctioning of one of the conduits delivering one of the potentially foamable ingredients to the applicator often went undetected until after the other ingredient had been dispensed. This resulted in the production of rejectable products and the wasteful consumption of valuable materials.

Accordingly, it is a general object of the instant invention to provide an improved apparatus and method which eliminates the costly and unreliable means of the prior art for delivering potentially foamable ingredients to an applicator.

It is another object of this invention to provide an improved apparatus and method which continuously monitors the inventory of the ingredients being used to produce a foamed or expanded material.

A further object of the present invention is to provide an improved apparatus and method for delivering component ingredients of a foamed or expanded material to an applicator under controlled conditions.

A still further object of the instant invention is to provide a light, compact, maneuverable and easy to maintain unit that not only insures proper metering and delivering of potentially foamable ingredients to an applicator but also simultaneously monitors the inventory of said ingredients during consumption thereof.

Yet another object of the instant invention is to provide a novel method and apparatus for varying the proportions of ingredients employed in producing a foamed or expanded material.

These and other objects of the present invention and the various details of the operation and construction thereof are hereinafter more fully set forth with reference to the accompanying drawings, in which:

FIGURE 1 is a schematic diagram of apparatus which can be employed for carrying out the process of this invention;

FIGURE 2 is a schematic of the electrical circuit for metering and monitoring means of the invention; and FIGURE 3 is a schematic representation of the diaphragm means which may be used in this invention.

Briefly described, the invention in its method aspect relates to a novel technique for delivering component ingredients to an appplicator whereby the consumption of the ingredients is accurately and continuously monitored or measured. The ingredients are delivered to the applicator under controlled conditions of amounts and flow and the proportions of component ingredients can be accurately varied if desired. The objectives of the instant invention can be best achieved by maintaining and delivering the component ingredients under pressure to the applicator from separate supply sources and by continuously recording the weight of each of said sources during the production of the foamed or expanded material.

Preferably the component ingredients, stored in separate supply sources under pressure, provide a foamed urethane. Generally, polyurethanes are prepared by chemical reaction between an organic compound having reactive hydrogen atoms and an organic isocyanate compound. As one of the component ingredients there is provided in a suitable pressurized tank or similar vessel any suitable organic compound having reactive hydrogen atoms, conventionally employed in the production of a urethane foam. Representative compounds include polyesters, polyesteramides, alkylene glycols, polyalkylene ether glycols and polythioethers.

Polyesters can be obtained by reacting any suitable dicarboxylic acid, such as for example, malonic acid, succinic acid, adipic acid, methyl adipic acid, sebacic acid, dihydromuconic acid, thiodipropionic acid, maleic acid, phthalic acid, and terephthalic acid with an excess of any suitable polyhydroxyl compound, such as, for example, ethylene glycol, diethylene glycol, triethylene glycol, polyethylene glycol, 1,2-propylene glycol, 1,4-butylene glycol, 1,6-hexanediol, glycerine, pentaerythritol, trimethanol propane, hexanetriol, castor oil, blown linseed oil, blown soya oil and the like.

Polyesteramides can be obtained by reacting, for example, any of the aforementioned dicarboxylic acids with ethylene diamine, tetramethylene diamine, hexamethylene diamine, N-methyl propylene triamine, piperazine, phenylene and naphthalene diamines, ethanolamine, propanolamine, N-methyl diethanolamine and hydroxyethyl aniline.

Suitable alkylene glycols include propylene glycol, ethylene glycol, trimethylene glycol, tetramethylene glycol, pentamethylene glycol and hexamethylene glycol.

Suitable polyalkylene ether glycols can be obtained by condensing, for instance, alkylene oxides containing from two to five carbon atoms such as, for example, ethylene oxide, propylene oxide, butylene oxide and amylene oxide or mixtures thereof. Polyalkylene ether glycols can also be modified with any suitable trihydric alcohol such as trimethanol propane, glycerine and the like to provide branched polyaddition products.

Suitable polythioether glycols can be prepared by condensing any suitable thioglycol such as thiodiglycol with a polyhydric alcohol such as ethylene glycol, and the like.

The organic isocyanate compound which is employed as a reactive ingredient to produce a foamed polyurethane is provided in a separate pressurized tank or vessel. Suitable organic isocyanate compounds include 2,4 toluene di-isocyanate, 2,6 toluene di-isocyanate, ethylene di-isocyanate, propylene 1,2 di-isocyanate, butylene 1,3 di-isocyanate, hexylene di-isocyanate, cyclohexylene 1,2 di-isocyanate, M-phenylene di-isocyanate, 3,3 dimethyl, 4,4 diphenylene di-isocyanate, triphenyl methane tri-isocyanate, 1,5 naphthalene di-isocyanate, 1-isopropyl-2,4-benzene di-isocyanate, diphenyl-4,2,4'-tri-isosyanate, 4-methoxy-1,3-phenylene di-isocyanate, 4-chloro-1,3-phenylene di-isocyanate, 4-ethoxy-1,3-phenylene di-isocyanate, 3,3'-dimethyl-4,4'-di-isocyanatodiphenyl methane, mesitylene di-isocyanate, durylene di-isocyanate, benzidine di-isocyanate, o-nitrobenzidine di-isocyanate, 4,4'-di-isocyanatodibenzyl, 3,3'-bitolylene-4,4'-di-isocyanate, decamethylene di-isocyanate, the reaction product of toluene di-isocyanate with trimethylolpropane at an NCO/OH ratio of 2:1, the reaction product of toluene di-isocyanate with 1,2,6-hexanetriol at an NCO/OH ratio of 2:1, the reaction product of toluene di-isocyanate with tris polypropylene glycol phosphite at an NCO/OH ratio of 2:1, e.g. when the tris polypropylene glycol phosphite is trisdipolypropylene glycol phosphite or is tris polypropylene glycol 2025 phosphite.

Various cross-linking materials, catalytic agents, reaction controlling ingredients, plasticizers, fillers and other materials affecting the physical and chemical properties of the products can be included in one or both of the separate pressurized tanks or vessels containing the basic component ingredients for forming the foamable polyurethane resin. Suitable cross-linking agents are, for example, the polyalcohols such as ethylene glycol, trimethanol propane and the like; polyamines such as ethylene diamine, diethylene triamine and the like and water. Suitable catalysts include potassium hydroxide, potassium acetate, quaternary ammonium hydroxides and preferably trialkyl amines such as trimethylamine, triethylamine, tri-n-propylamine, tri-n-butylamine, dimethylethylamine, dimethyl-n-butylamine, dimethylisobutylamine. The trialkylamines can be used in combination with sodium methyl siliconate $CH_3Si(OH)_2ONa$.

Broadly contemplated, the method of the instant invention comprises providing a plurality of pressurized reservoirs for the component ingredients of the material to be expanded or foamed, delivering the component ingredients under pressure to an applicator, and simultaneously metering and monitoring the inventory of the component ingredients being delivered to the applicator.

In FIGURE 1 there is shown a schematic diagram of the apparatus which can be employed in carrying out the objectives of the instant invention. Thus tanks 10 and 12 are reservoirs for the organic compound having reactive hydrogen atoms and an organic isocyanate compound either or both containing, if desired, other materials such as a catalyst, filler, cross-linking agent or the like.

The component ingredients in each of the tanks 10 and 12 are admixed with a blowing agent, preferably a fluorohydrocarbon and are maintained under a pressure greater than about 200 lbs./in.$^2$ and preferably about 240 lb./in.$^2$. It will be recognized, of course, that higher pressures can be utilized and generally the pressure is sufficient not only to maintain the fluorocarbon blowing agent in the liquid state at ambient temperature but also to deliver the component ingredients at a rate of about 15–40, preferably about 35 lbs. per minute to the applicator. The fluorocarbons suitably employed as a blowing agent include, for instance, trichloromonofluoromethane,
dichlorodifluoromethane,
monochlorotrifluoromethane,
monobromotrifluoromethane,
monochlorodifluoromethane,
trichlorotrifluoroethane,
dichlorotetrafluoroethane and
octafluorocyclobutane cyclic.

Conveniently during depletion of the component ingredients from the pressurized vessels, the pressure can be maintained substantially constant by introduction therein of predetermined amounts of an inert gas such as nitrogen.

As shown in FIGURE 1, valves 14 and 16 are opened and the materials from tanks 10 and 12, respectively, are permitted to pass under pressure via conduits 18 and 20, also respectively, to the applicator 22 which conveniently can be a spray gun of any conventional type. Typical spray guns are shown, for instance, in U.S. Patent 2,146,416 to Bromsen et al., Feb. 7, 1939, and U.S. Patent 2,249,771 to MacMartin, July 22, 1941. The conduits 18 and 20 are in operative engagement with applicator inlet lines 24 and 26, respectively through quick disconnects 28 and 30, respectively, to facilitate disassembly of the apparatus without loss of pressure in the vessels 10 and 12. Quick disconnects 32 and 34 are also provided in lines 18 and 20 adjacent the outlets 36 and 38 of tanks 10 and 12 which are provided with valve means 40 and 42, respectively. Pressurizing agent is supplied to tanks 10 and 12 from a nitrogen supply source 41 through line 43 which in turn is in fluid communication with line 44 leading to tank 10 through check valve 46 and quick disconnect 48 and with line 50 leading to tank 12 through check valve 52 and quick disconnect 54.

The tanks 10 and 12 are suitably mounted on inventory monitoring means 55 and 56, respectively. The monitoring means can comprise pneumatic scales, conventional beam scales, electronic strain gauges or any other conventional equipment suitable for indicating the weight of the tanks during the depletion of the contents thereof in the spraying operation. Conveniently, the monitoring means 55 and 56 are operatively connected to indicator means 58 which independently reflects the weight of the materials in tanks 10 and 12 during operation.

To transduce the weight indications provided by monitoring means 55 and 56 to a form of energy which can be utilized to actuate the indicator means 58 and the apparatus employed to shut down the dispensing unit upon detection of imbalance in the flow of materials from tanks A and B, transducer means or tare controls 72 and 74 are respectively connected to tanks 10 and 12. This transducer means may be any known means which are capable of transducing weight indications generated by such monitoring means as pneumatic scales, conventional beam scales, etc. to air pressure. This air pressure which would be present in the output connections 76 and 78 from tare controls 72 and 74, respectively, would be utilized to actuate the individual indicators which are provided on the indicating means 58 to register the weight of tanks 10 and 12, respectively. In other words, individual indicators are provided on the indicator means 58 for tanks 10 and 12. Therefore, when both of the tanks 10 and 12 are initially filled with the same amount of material and the flow rate from each of the tanks is adjusted to be equal, the individual indicators (labeled A and B for tanks 10 and 12, respectively) will move together, as the weight of each of the tanks 10 and 12 decreases, provided there is no malfunctioning within the system to cause a flow rate imbalance with respect to tanks 10 and 12.

Therefore a constant, visual evaluation can be made of the reduction of materials in each tank. This ability to visually monitor material balance obviates the need for frequently checking the flow at the discharge ports of applicator 22. Further, this visual indication provides the capability of instantly determining the inventory of the materials within tanks A and B.

An electric fail-safe system is also provided to indicate by means of lights any imbalance in the flow from tanks 10 and 12 and from which tank the imbalance has occurred. Further, this electric fail-safe system provides for a shut down of the system whenever an imbalance is detected. This will be described in more detail hereinafter. The electric fail-safe system is schematically depicted in FIGURE 1. The pressure of the air in the output connections 76 and 78 from tare controls 72 and 74 are also connected to an imbalance indicator 80, which detects differences in the air pressures in the outputs from tare controls 72 and 74. Upon detection of imbalance of the air pressure, detector 80 generates an electrical signal which actuates manual-automatic switch 82.

When this switch is set to its manual position, any detection of an imbalance condition by detector 80 will not result in automatic shutting down of the dispensing equipment until a given timing period for applying the materials has elapsed. However, when this switch is set to automatic, the dispensing unit is immediately and automatically shut off upon detection of an imbalance condition. The electrical energy necessary to operate the electrical controls associated with the dispensing equipment is derived through plug 84, which, of course, is connected to a suitable outlet. The electrical power is then passed through fuse 86 and power switch 88 to timer 90. Timer 90 controls electric valve 92. Electric valve 92 regulates the air pressure and conduit 94 which is connected to applicator 22 through applicator inlet line 96 and quick disconnect 98. The air in this line actuates the valves in all other lines which are connected to the applicator 22. When the proper air pressure is present in this line, all other lines open and the dispensing of material commences. As soon as the air flow within conduit 94 is terminated, dispensing stops immediately.

Timer 90 determines how long electric valve 92 remains open to pass actuating air through conduit 94. This amount of time is preferably 4 to 5 seconds but, of course, varies with the particular application. The electric flow valve 92 may be of any known type which provides control over the amount of air passing through a conduit in response to an electrical actuating signal.

Indicator lights 100, 102 and 104 are also provided to indicate automatically when imbalance has occurred. Lights 100 and 104 are associated with the tanks 10 and 12, respectively. Whenever the flow rate from either of these tanks is less than the flow rate from the other tank, the proper light goes on. For instance, if the flow rate from tank 12 were less than that from tank 10 because some obstruction formed in the output conduit from tank 12, then indicator light 104 would go on. When there is no imbalance condition present, a normal light 102 will be lighted. The manual-automatic switch 82 determines which of the indicators 100, 102 and 104 will be energized.

Detector means 80 is shown in FIGURE 3 in more detail. Also shown are tare controls 72 and 74. As stated before, the air pressure from the tare controls 72 and 74 indicates the weights of the tanks 10 and 12, respectively. If the contents of each of these tanks are to be supplied to the applicator 22 at equal flow rates, then the difference in the air pressure in connections 76 and 78 indicates any imbalance that might arise in the flow rates. When the flow rates are equal, the air pressure applied to a diaphragm 106 within detector means 80 is equal on both sides of the diaphragm. The diaphragm 106 is electrically conductive and, therefore, when an imbalance does occur, the diaphragm is moved to either electrical contact 108 or 110 thereby closing an electrical circuit across terminals 112 and 114 or across terminals 114 and 116, depending on which of the tanks has a low flow rate associated therewith.

An imbalance adjuster 118 may be provided to adjust the diaphragm position. An additional air input line 120 provides additional air to detector 80 and thereby provides a means for adjusting the diaphragm position to a point approximately half-way between contacts 108 and 110 when it is desired to have the flow rate from tanks 10 and 12 be other than equal. Preferably, however, it is desirable to employ equal flow rates from tanks 10 and 12.

Reference should now be made to FIGURE 3, which shows the electrical schematic of the control circuit for the dispensing unit. Electrical energy is supplied from power supply terminals 122 and 124. Fuse 86 and power switch 88, as shown in FIGURE 1, control the supply of energy from terminals 122 and 124. Operation of a circuitry will first be described for when the automatic-manual switch 82 is in the automatic position. When in this position, the timer 90 which supplies the actuating control voltage to electric valve 92 is automatically turned off whenever an imbalance condition occurs. When the start button 124 is closed, the timing function begins. Start button 124 is of the press-to-start type and permits electrical energy to be delivered from terminal 122 through relay contacts 126 and 128 through switch 82 and the start button 124 to actuate timer motor 130 through normally closed switch 132. Timer clutch solenoid or clutch 138 is also actuated at this time. The circuit is completed to terminal 125. The energization of clutch 138 causes contacts 134 to immediately move upward, thereby actuating the solenoid 136 of electric valve 90. This sets into action the dispensing process, as described before with respect to FIGURE 1. To maintain an electrical connection through motor 130 after switch 124 returns to its normal position, clutch 138 causes contact normally open 140 to close thereby maintaining energization of the motor 130 through contacts 142 and contact 140. After the predetermined time interval has elapsed, motor 130 times out thereby releasing contacts 142, releasing clutch 138, and subsequently contacts 134 thereby deenergizing solenoid 136 and hence shutting down the dispensing unit.

If an imbalance occurs while the materials are being dispensed, detector 80 will respond. The diaphragm 106 of detector 80 causes contacts 108 and 110 to actuate relays 144 and 146, respectively, in accordance with the particular imbalance condition which occurs. For instance, if the flow rate from tank 10 becomes lower than that from tank 12, then contact 108 will close, as discussed in more detail with respect to FIGURE 2, thereby energizing relay 144. When relay 144 is energized, normally open contact 148 will close and thereby maintain energization of relay 144 even though contact 108 fails to maintain contact. This also applies for a normally open contact 150 with respect to relay 146.

Also upon the energization of relay 144, contact 126 is switched to its lowermost position thereby illuminating indicator 100, as discussed with respect to FIGURE 1. Illumination of lamp 104 when relay 146 is energized, thereby switching contact 128 to its lowermost position, is similar to the energization of indicator 100. Note that when neither relay 144 or 146 is energized, a circuit is provided through contacts 126 and 128 to energize indicator 102 from terminals 122 and 124 and thereby provide an indication that the flow rates are normal or that equipment performance is satisfactory.

Note also that when either contact 126 or 128 is moved to its lowermost position, the energization of clutch 138 through the automatic switch setting is interrupted. This, of course, automatically sets into operation de-energization of solenoid 136, as discussed before, and thereby turns off the dispensing unit.

When the manual-automatic switch 82 is in its manul position, note that the transfer of either contact 126 or 128 to its lowermost position does not effect the energization of the motor 130 and, therefore, the dispensing operation will continue for the predetermined amount of time established by the timer. This feature is particularly important in establishing the initial settings of the flow control valve means 14 and 16. For instantce, with both valves open and the timer set at 5 seconds (for instance), the imbalance adjuster 118 set for centering the diaphragm 106, and the indicators on the indicator means set at the inventory amount of the materials within tanks 10 and 12, the flow rates from each of the tanks 10 and 12 can be equalized by removing the applicator 22 and placing cups at the outputs of applicator inlet lines 24 and 26, respectively, and turning the equipment on. By placing the manual-automatic switch to its manual position, material will flow into both cups irregardless of any imbalance that occurs. Therefore, when the 5 seconds has elapsed, both cups can be weighed. The one with the most material in it corresponds to the particular valve means that must be adjusted. Therefore, if the material from tank 10 weighed one pound and the material from tank 12 weighed three-fourths of a pound, it would be necessary to pinch off the material from tank 10. By repeating this operation, the flow from each of the tanks can quickly be adjusted until the desired flow rates are obtained.

Note that the provision of the electric timer 90 in conjunction with the air actuated, electric valve 92 permits repetitive production of like quantities.

Further, since the materials supplied to the actuator are immediately cut off when imbalance occurs, this prevents the production of a large number of bad products before it is realized that one of the supply conduits to the applicator has become clogged. Further, utilization of a visual indication of the weights of the tanks allows an operator to appreciate when the flow rate from one tank is becoming less than that from another and, therefore, this gives the operator an opportunity to manually adjust the flow control valves when necessary.

Although this invention has been described with respect to two tanks, this number is only illustrative of the number of tanks that might be used, the main principle of the invention being the weighing of materials being supplied to an applicator from different tanks and the utilizing of these weights to provide an electrical control signal whenever the proportion of the weights of the plurality of supply tanks deviates from a predetermined standard.

Manual-automatic switch 82 also has a reset position as shown in FIGURE 3 and by moving switch 82 to this position the halting of the dispensing unit, as discussed above, will be accomplished. Further, by moving switch 82 to the reset position, the energization of relays 144 or 146 through maintaining or sealing contacts 148 or 150, respectively, will be interrupted, thereby allowing readjustment of the control system whenever this is required. Also, the reset position prevents operation of timer 90, thereby preventing material discharge.

Switch 132, which is normally closed, is mechanically opened by the motor 130 just after the timed out position is reached. This prevents overrunning damage to the motor in the event that momentary start switch 124 is manually maintained for an excessive period of time or a short exist in the remote start apparatus which may be connected to receptacle 154, which is described in more detail hereinafter.

Thus there has been described a plurality of means (scales 55 and 56) for weighing, respectively, the containers or tanks 10 and 12 and the materials therein, a plurality of means (transducers 72 and 74) for respectively converting the weight indications to air pressure, indicator means (indicator 58) including a plurality of indicators (A and B) for respectively indicating the weights of said containers (the indicators being responsive, respectively, to said air pressures, means (detector 80) responsive to said air pressures for detecting deviations of said air pressures from a predetermined proportion of said air pressures and for generating an electrical control signal for controlling the rate of flow of said materials, timing means (timer 90) for determining the length of time that production of the material occurs, and halting means (electric valve 92 and the control circuitry described in FIGURE 3 for halting the dispensing unit prior to the expiration of the predetermined time for production of the material) for halting the production of the foamed material whenever the said control signal occurs.

It is also within the scope of the invention to use the scale deflections generated by scales 55 and 56 to actuate the indicator 58 directly. Also, these scale deflections may be immediately transduced to electrical signals, which can be compared against one another in terms of amplitude to determine if an imbalance has occurred.

Transformer 109 is provided to supply the proper operating voltages for relays 144 and 146 and outlet or receptacle 154 is provided so that any type of press-to-start switch (not a maintained contact) can be plugged into the outlet 154. This may be a foot-operated switch, a button on the wall, or a trigger on the applicator 22.

When the spraying is complete, valve 60 is positioned to communicate with line 62 leading to inlet of solvent tank 64 controlled by valve 66. Preferably the solvent employed can be dry methylene chloride although other conventional cleaning agents can be used to flush the applicator. During this flushing operation, valve 68 in fluid communication with the outlet of solvent tank 64 and line 70 is opened to pass the solvent, via air pressure to the spray gun 22.

Example

As an organic compound having reactive hydrogen groups, there is employed a polyester conventionally prepared from the reaction of diethylene glycol, adipic acid and trimethylol propane. The polyester is mixed with trichloromonofluoromethane. The resulting mixture was placed in tank 10 under a pressure of 220 lbs./in.$^2$. The filled tank weighed 580 lbs.

A conventional isocyanate mixture of m-toluene diisocyanate and a catalyst such as trimethylamine is mixed with trichloromonofluoromethane and is introduced into tank 12 under a pressure of 220 lbs./in.$^2$. The filled tank weighed 500 lbs. The tanks were maintained under a constant pressure of 220 lbs./in.$^2$ by addition thereto of nitrogen. The contents of the tanks were fed separately though simultaneously to the spray gun applicator 22 at a rate of 35 lbs. per minute. For each part of polyester delivered to the spray gun, one part of isocyanate is also delivered thereto. It will be noted that other ratios of polyester or like material to isocyanate can also be employed depending, of course, on the end product desired. The weight of each tank is continuously determined by scales 55 and 56 and indicated on indicator 58. This monitoring of the reactant material inventory permits easy control of the ratio of materials being used and ultimately the quality of the final product.

The ratio of the amounts of fluorocarbon blowing agent employed to the amount of organic compound containing reactive hydrogen atoms and organic isocyanate compounds can vary widely depending on, for instance, the organic compounds used, the particular fluorocarbon chosen, the rate of delivery to the applicator desired and the particular ratio of one organic compound to the other chosen.

In addition to the components for producing a urethane resin, other components can be employed to produce such foamed resins as chlorinated rubber, cellulose ethers and esters, e.g., ethyl cellulose, cellulose acetate, cellulose acetatebutyrate, homopolymers and interpolymers of monomeric compounds containing the $CH_2=C$ grouping such as olefins, e.g., ethylene, propylene, isobutylene, butene-1, vinyl halides, e.g., vinyl chloride and vinyl fluoride, vinylidene chloride, vinyl esters of carboxylic acids, e.g., vinyl acetate, vinyl stearate, vinyl benzoate, vinyl ethers, e.g., vinyl methyl ether, vinyl ethyl ether, vinyl isobutyl ether, chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloroacrylate, ethyl acrylate, methyl methacrylate, acrylamide, acrylonitrile, methacrylonitrile, and interpolymers of the above-mentioned vinylidene monomers with alpha, beta unsaturated polycarboxylic acids and derivatives thereof, e.g., maleic anhydride, diethyl maleate, dibutyl fumarate, diallyl maleate and dipropyl maleate.

Likewise, there can be used ingredients to produce foamed thermoplastic resins such as homopolymers and interoplymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alphamethylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile.

Other suitable thermoplastic resins include polycarbonates, e.g., the polymer from bisphenol A and diphenyl carbonate, polyoxymethylene (Delrin), oxymethylene-alkylene oxide copolymers, e.g., oxymethyleneethylene oxide (95:5); Dacron (polyethylene terephthalate), nylon (e.g., polymeric hexamethylene adipamide). ABS terpolymers can be used, e.g., the terpolymer of 25% butadiene, 15% acrylonitrile and 60% styrene. Thermosetting materials such as ureaformaldehyde, phenol-formaldehyde or melamineformaldehyde can also be employed.

Although a specific embodiment of the invention is shown and described, it will be understood that it is but illustrative and that various modifications may be made therein without departing from the scope and spirit of this invention.

What is claimed is:

1. Apparatus for producing a foamed, expanded material from a plurality of reactive ingredients comprising
    (a) a pressurized supply reservoir for each of said ingredients,
    (b) inert gas supply source for maintaining each of said supply reservoirs under substantially constant pressure,
    (c) conduit means detachably, sealingly connected to the outlet end of each of said reservoirs and adapted to be detachably, sealingly connected to the inlet end of an applicator,
    (d) each of said conduit means being provided with valve means for metering said ingredients to said applicator,
    (e) air supply source and air supply conduit detachably, sealingly connected to said applicator for discharging said ingredients therefrom,
    (f) means for continuously monitoring the inventory of said supply reservoirs, and
    (g) electrical means operatively connected to said monitoring means and said air supply source for selectively supplying said air to said applicator.

2. The apparatus of claim 1 wherein the means for continuously monitoring the inventory of said supply reservoirs comprises pneumatic scale means.

3. Apparatus as in claim 1 wherein said monitoring means includes:
    a plurality of means for weighing respectively the reservoir for each of said ingredients;
    a plurality of means for respectively converting the weight indication from said weighing means to air pressure; and
    indicator means including a plurality of indicators for respectively indicating the weights of said reservoirs and the materials contained therein, said indicators being responsive respectively to said air pressures.

4. Apparatus as in claim 3 including means responsive to said air pressures for detecting deviations of said air pressures from a predetermined proportion of said air pressures and for generating an electrical control signal for controlling the rate of flow of said materials.

5. The apparatus of claim 1 wherein said electrical means includes:
    an electrically-actuated device; and
    an electrical circuit for controlling said device in response to a detection signal indicating that said control must be exercised.

6. The apparatus of claim 5 wherein said electric circuit further includes:
    means for energizing said controlled device for a predetermined interval of time;
    means for interrupting said timed operation and de-energizing said controlled device in response to said control signal; and
    means for externally indicating the presence of said control signal.

7. The apparatus of claim 1 wherein said monitoring means includes:
    a plurality of means for respectively weighing said reservoirs and the ingredients contained therein.

8. The apparatus of claim 7 wherein said electrical means includes:
    a plurality of means for generating respective sisgnals representing the weights of said ingredients and said reservoirs;
    means for comparing said electrical signals and generating a control signal whenever the relationship between said electrical signals deviates from a predetermined standard;
    means for halting the supply of said ingredients for producing said materials;
    time means for regulating the length of time said producing of said material takes place; and
    means for initiating said halting means before said timed interval elapses in response to said control signal.

9. Apparatus as in claim 8 further including means for inhibiting the energization of said halting means by said means for initiating halting in respose to said control signal.

References Cited
UNITED STATES PATENTS

| | | | |
|---|---|---|---|
| 2,441,235 | 5/1948 | Blair et al. | 222—58 |
| 2,560,949 | 7/1951 | Harmon | 239—304 |
| 2,607,555 | 8/1952 | Noble | 222—58 |
| 2,658,644 | 11/1953 | Lowe | 222—58 |
| 2,860,856 | 11/1958 | Bauer | 239—335 |
| 3,008,808 | 11/1961 | Hodges | 239—304 |
| 3,083,913 | 4/1963 | Coffman et al. | 239—335 |

EVERETT W. KIRBY, *Primary Examiner.*

U.S. Cl. X.R.

239—304, 235, 428; 222—57; 137—87; 177—3; 260—2.5; 18—2.1